United States Patent [19]
Forrest

[11] Patent Number: 6,084,875
[45] Date of Patent: Jul. 4, 2000

[54] ROUTING OF INTERNET TRAFFIC AND RELATED INTERNET SERVICE PROVIDER SERVICES

[75] Inventor: Antonio G. Forrest, Plano, Tex.

[73] Assignee: Ericsson Inc., Research Triangle Park, N.C.

[21] Appl. No.: 08/960,602

[22] Filed: Oct. 29, 1997

[51] Int. Cl.⁷ .................................................. H04L 12/28
[52] U.S. Cl. .......................................... 370/355; 370/431
[58] Field of Search .................................... 370/352, 353, 370/354, 355, 356, 401, 402, 403, 404, 405, 431, 437, 461, 462, 468; 379/93.23, 93.01, 88.17, 90.01, 88.13, 88.14, 93.05

[56] References Cited

U.S. PATENT DOCUMENTS

| | | | |
|---|---|---|---|
| 5,898,839 | 4/1999 | Berteau | 709/227 |
| 5,923,659 | 7/1999 | Curry et al. | 370/401 |
| 5,940,497 | 8/1999 | Miloslavsky | 379/265 |
| 5,949,763 | 9/1999 | Lund | 370/261 |
| 5,958,016 | 9/1999 | Chang et al. | 709/229 |
| 5,970,065 | 10/1999 | Miloslavsky | 370/352 |

FOREIGN PATENT DOCUMENTS

| | | |
|---|---|---|
| WO 97/29584 | 8/1997 | WIPO . |
| WO 97/38551 | 10/1997 | WIPO . |

OTHER PUBLICATIONS

P. Carbone; Internet Thruway: A Profitable New Route for Data Traffic; Telesis, No. 102; Dec. 1996; pp. 6–15.

Harold Orlamuender and Patric Bleuse; Handling Internet Traffic in Telecommunications Networks; Iss. '97, World Telecommunications Congress (International Switching Symposium), Global Network Evolution: Convegence or Collission?, Toronto; Sep. 21–26, 1997; vol. 1; pp. 579–586.

Jürgen Kotschenreuther; Betreiber Brauchen Offene Netzmanagementsysteme; NTZ Nachrichtentechnische Zeitschrift, vol. 50, No. 5, 1997; pp. 50–52.

Larry Schessel; Wie Entwickelt Sich Das "Netz Der Netze"?; Telcom Report, vol. 19, No. 5/06, 1996; pp. 7–9.

PCT International Search Report dated Apr. 1, 1999.

*Primary Examiner*—Chi H. Pham
*Assistant Examiner*—Kwang B. Yao
*Attorney, Agent, or Firm*—Jenkens & Gilchrist, P.C.

[57] ABSTRACT

A telecommunications system and method for routing Internet traffic without interfering with normal voice traffic on trunklines and circuits. This can be accomplished by implementing a "Traffic Route Control" functionality by local service providers to provide a method for managing and segregating Internet traffic so as to not interfere with voice traffic. In addition, with this "Traffic Route Control" functionality, a "Single Number Access" functionality service can be provided to the ISPs, in which a single 800 number accesses and routes calls to the closest local access number. Furthermore, a "Traffic Statistics" functionality can be introduced as a service to the ISPs to provide a WEB-based interface, which allows ISPs to collect, retrieve, print, view and/or transfer statistical information on traffic patterns associated with their allocated trunklines.

20 Claims, 5 Drawing Sheets

ROUTING OF INTERNET TRAFFIC AND RELATED INTERNET SERVICE PROVIDER SERVICES

BACKGROUND OF THE PRESENT INVENTION

Field of the Invention

The present invention relates generally to telecommunications systems and methods for providing access to the Internet, and specifically to routing Internet traffic using dedicated Internet Service Provider (ISP) trunklines, which separates Internet traffic from normal voice traffic, enables Internet Service Providers to maintain a single national access number, and allows Internet Service Providers (ISPs) to obtain statistical information regarding traffic patterns.

BACKGROUND AND OBJECTS OF THE PRESENT INVENTION

Since the beginning of the telephone in the 1870's, signaling has been an integral part of telephone communications. The first telephone devices depended on the receiving party standing next to the receiver at the time of the call. Later, after the formation of the Bell Telephone Company, the telephone ringer was invented, eliminating the foreknowledge requirement. By lifting the receiver and allowing DC current to flow through the phone and back through the return of the circuit, a lamp would be lit on the exchange operator's switchboard to signal the operator that a call was trying to be placed.

However, early signaling methods were somewhat limited because they used the same circuit for both signaling and voice. In addition, they were analog and had a limited number of states, or values, that could be represented. In the early 1960's, Europe began digitizing the network, removing the signaling from the voice network, and placing the phone signals on a separate network. With this division of signaling and voice, the call setup and tear-down procedures required with every phone call were performed faster, while reserving the separate voice and data circuits for use when a connection was possible, e.g, no voice connection is needed when the called party's number is busy. Common Channel Signaling (CCS), which uses a digital facility, but places the signaling information in a time slot or channel separate from that of the voice or data it is related to, has become the foundation for telecommunications today.

In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN, everything is controlled or configured by workstations with user-friendly software. Telephone service representatives can, therefore, create new services and tailor a subscriber's service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. The basic infrastructure needed is composed of various signaling points, which both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPS) 100 serve as the local exchanges in a telephone network 90, a portion of which is shown in FIG. 1. The SSPs 100 also provide an Integrated Services Digital Network (ISDN) interface for the Signal Transfer Points (STPs) 110, as is understood in the art. ISDN signaling uses a separate channel and is compatible with the IN. The signaling information is handed off to the IN network and transferred to the end office (another SSP) using an ISDN User Part (ISUP) protocol, which is responsible for all call setup and tear down.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

A separate network that provides data, not voice, communications is known as the "Internet". The Internet is based on the Internet Protocol/Transmission Control Protocol (IP/TCP protocol), which was developed as a standard protocol to allow different types of computers to exchange electronic mail and other files over a network. The IP/TCP Protocol specifies the addressing of nodes on the Internet and a provides a method of sending packets of data from one node to another. The TCP or Transmission Control Protocol is an application implemented on top of the Internet Protocol to provide reliable delivery of the data packets.

Typically, an Internet session begins by a computer dialing the telephone number to an Internet Service Provider. A Point-to-Point (PPP) protocol or Serial Line Internet Protocol (SLIP) connection is established between the computer's modem and the Internet Service Provider (ISP) when the ISP answers the call. During a session, digital data is exchanged over the subscriber's line using the standard IP/TCP protocol in the form of packets.

Many local service providers (SSPs) provide local access to Internet Service Providers (ISPs). Routing of Internet calls places large demands on voice trunks. If not managed correctly, the long duration of these calls, as compared to regular voice calls, provides for an inefficient use of trunklines and circuits. In addition, under present architecture, Internet Service Providers (ISPs) who operate nationwide are forced to provide different local phone numbers for each city where they operate. Therefore, business travelers who subscribe to these services must maintain a list of different access numbers for each city. Furthermore, on the average, ISPs are charged by the local service providers for only local calls made into the network, which reduces the amount of potential revenue that the local service providers can collect from the ISPs.

Finally, there is currently no efficient manner for Internet Service Providers to collect statistical information on customer usage/demand and/or traffic patterns in general. Any statistical information that can be collected has to be collected and delivered to the ISP by the local service provider. This lack of ease of collection of statistical information places manpower demands on the local service provider to collect and process the statistical information, and in the end it is the ISP who suffers by not having this information readily available.

It is therefore an object of the invention to route Internet traffic without interfering with normal voice traffic on trunklines.

It is a further object of the invention to provide a national number for accessing each Internet Service Providers.

It still a further object of the invention to allow Internet Service Providers to analyze traffic patterns in order to obtain information regarding customer usage/demand and/or traffic patterns in general.

SUMMARY OF THE INVENTION

The present invention is directed to telecommunications systems and methods for routing Internet traffic without interfering with normal voice traffic on trunklines and circuits. This can be accomplished by implementing a "Traffic Route Control" functionality by the local service providers to provide a method for managing and segregating Internet traffic so as to not interfere with voice traffic. In addition, with this "Traffic Route Control" functionality, a "Single Number Access" functionality service can be provided to the ISPs, in which a single 800 number accesses and routes calls to the closest local access number. The "Single Number Access" functionality is implemented by creating and maintaining a database containing both the calling party number information, such as the Numbering Plan Area (NPA), e.g., area code, and Office Code (NXX), e.g., the first three numbers of a seven-digit telephone number, and the associated local access number. Furthermore, a "Traffic Statistics" functionality can be introduced as a service to the ISPs to provide a WEB-based interface to each local service provider's network, which allows an ISP to collect, retrieve, print, view and/or transfer statistical information on traffic patterns associated with their allocated trunklines. In the event that an ISP uses the "Single Number Access" functionality, the "Traffic Statistics" functionality allows the ISP to update customer-specific data for the local service providers directly through the Internet.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
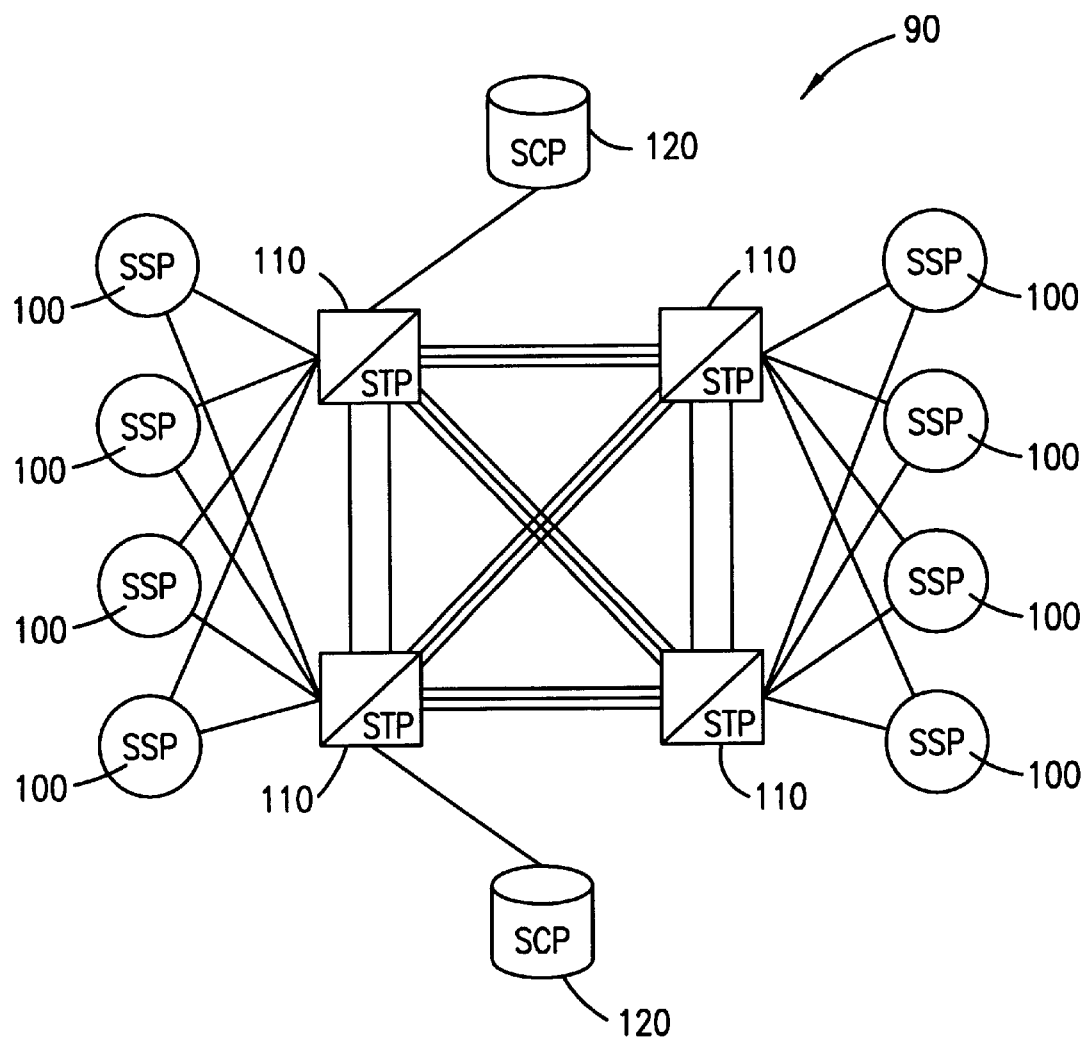
FIG. 1 is a block diagram illustrating some of the basic components used in an Intelligent Network or an Advanced Intelligent Network for signal switching.
Figure 2:
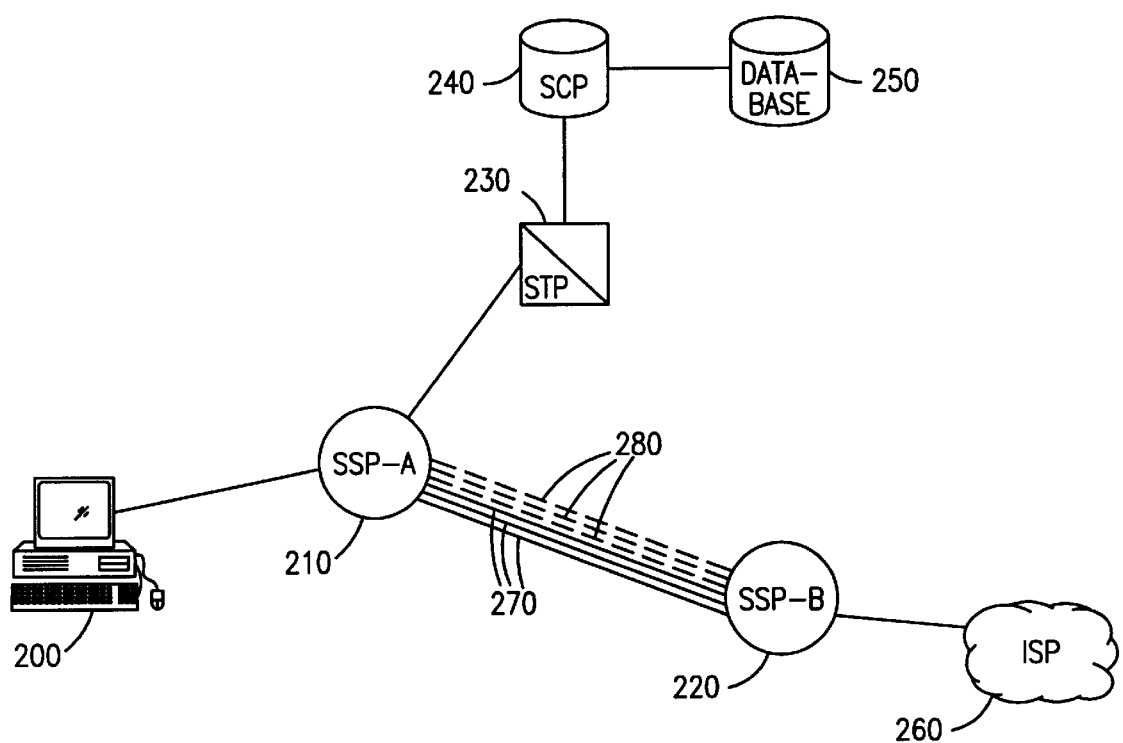
FIG. 2 shows routing of Internet traffic over dedicated Internet Service Provider (ISP) trunklines, in accordance with preferred embodiments of the present invention.

With reference now to FIG. 2 of the drawings, a sample embodiment of the present invention is depicted, in which a "Traffic Route Control" functionality for Internet Service Providers (ISPs) 260, e.g., America On-Line, is implemented by a local service provider (SSP-A) 210 to allow the local service provider (SSP-A) 210 to identify specific routes 270 and assign them to individual ISPs 260. The local service provider (SSP-A) 210 can either reserve existing trunklines 270, install additional trunklines 270, or reserve bandwidth on existing trunklines 270 for each ISP 260. Calls placed to ISPs 260 can then only be routed on these reserved trunklines 270, thus separating ISP traffic from normal voice traffic.

Figure 3:
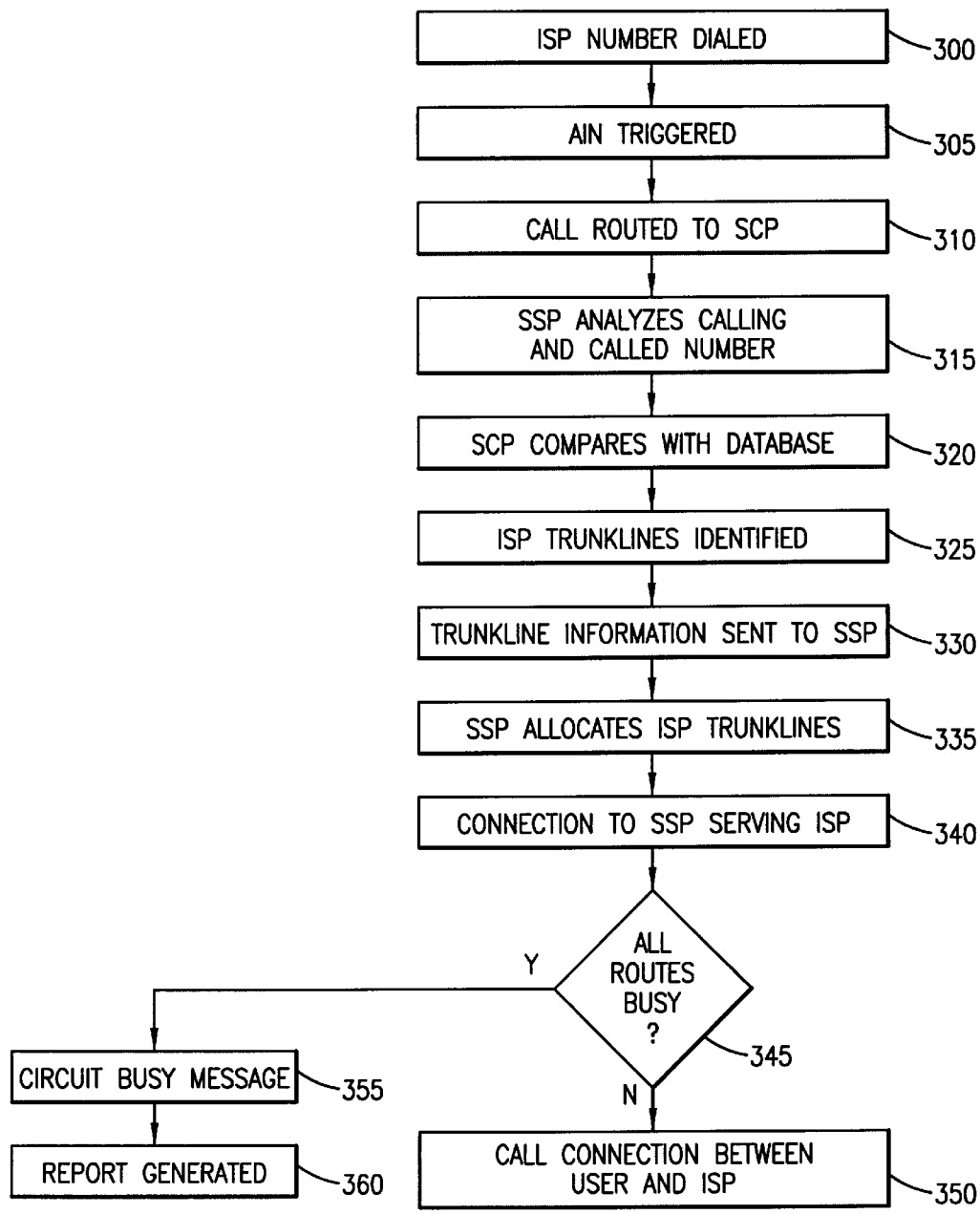
FIG. 3 illustrates steps in a sample embodiment of the ISP routing system and method of the present invention.

Initially, as indicated in FIG. 3 of the drawings, an Internet user 200, e.g., a computer, dials the access number for a specific ISP 260 (step 300). This call is then triggered as an AIN call (step 305), which is routed from an end office 210, e.g., a Service Switching Point (SSP) for a wireline Internet user, or a Mobile Switching Center (MSC) for a wireless Internet user, serving the Internet user 200 to a Service Control Point (SCP) 240 (step 310) via a Signaling Transfer Point (STP) 230. The SCP 240 then analyzes the calling number and the called (ISP) number (step 315), compares them with a list of calling numbers, ISP numbers, and associated trunklines (step 320), which is stored in a database 250, and identifies the dedicated ISP trunkline(s) 270 (step 325), which will be used to route the call to the appropriate ISP 260. This routing information is then sent back to the Service Switching Point (SSP-A) 210 serving the Internet user 200 via the STP 230 (step 330) to allocate the dedicated ISP trunkline(s) 270 (step 335) and connect the call to the SSP (SSP-B) (local access point) 220 where the ISP 260 resides (step 340). Finally, a call connection is established between the Internet user 200 and the ISP 260 (step 350).

In the case where the identified routes 270 are all in use (step 345), a "circuit busy" message can be played (step 355), and an automatic report can be generated identifying the busy condition (step 360). This "Traffic Route Control" functionality allows local service providers (SSPs) 210 to lease access by the ISPs 260 to these ISP trunklines 270 on a trunk by trunk basis. As the number of "circuit busy" conditions increase, the local service provider 210 can correspondingly increase the number of circuits and/or trunklines. Also, by identifying and assigning specific trunklines 270 to ISPs 260, the local service providers 210 can separate Internet traffic from normal voice traffic.

Advantageously, in the case where the number dialed is a non-ISP number, and all non-ISP trunklines 280 are busy, the local service provider 210 has the option of initiating a "circuit busy" announcement or routing the call through idle dedicated ISP trunklines 270.

Figure 4:
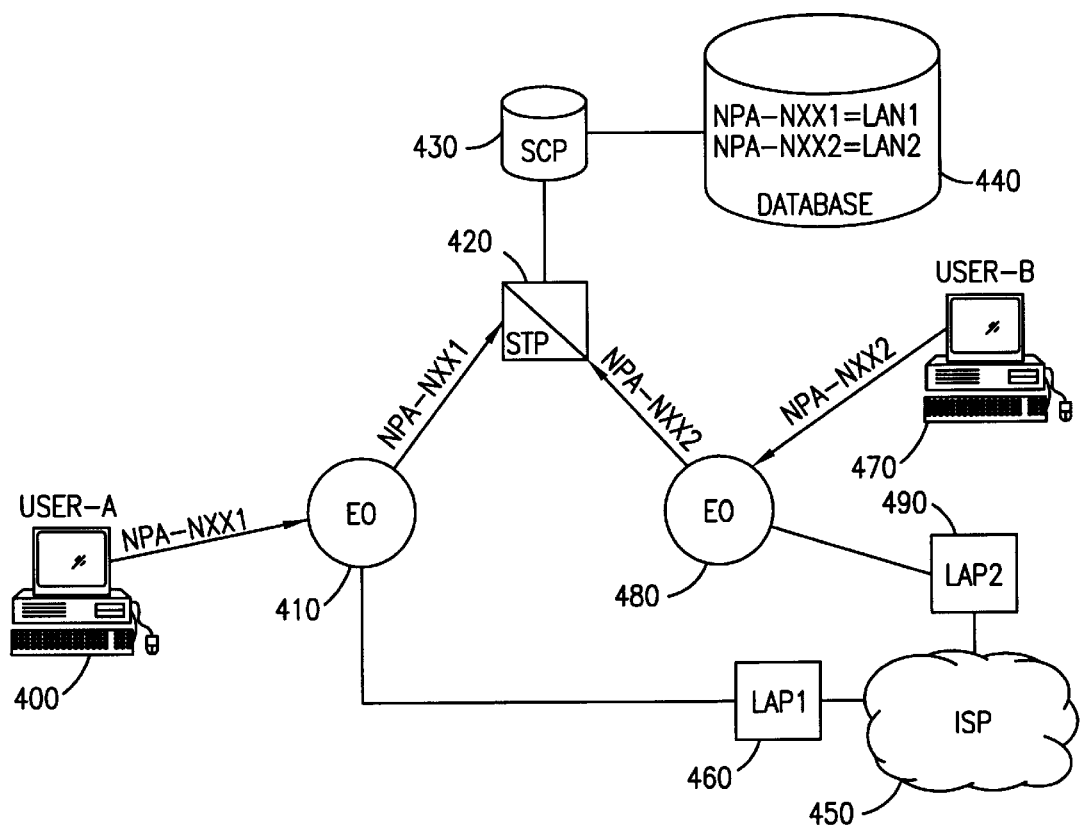
FIG. 4 shows routing of Internet traffic through local access points, using a single national access number.

Along with the "Traffic Route Control" functionality, a "Single Number Access" functionality can be implemented as a service to each ISP 450 to allow each ISP 450 to have a single national access number. With reference now to FIG. 4 of the drawings, when an Internet user, hereinafter referred to as User-A 400, dials the national access number associated with an ISP 450, the call is triggered as an AIN call, which is routed to a SCP 430 via a STP 420. The SCP 430 then compares the calling number information (NPA-NXX1) against a database 440 of calling number information, e.g., NPA-NXX (Number Plan Area-Office Code), and associated local access numbers (LANs) to determine the correct local access number (LAN1). This database 440 can be the same database 250 that contains the trunkline information for routing of the ISP 260 call.

This local access number (LAN1) is then sent back to the SSP (end office) 410 serving User-A 400 via the STP 420. The SSP 410 then connects the call, using the correct local access number (LAN1) and dedicated trunklines 270, to the appropriate local access point (LAP1) 460. Finally, a call connection is established between User-A 400 and the ISP 450. Another Internet user, hereinafter referred to as User-B 470, connected to a different SSP 480, can use the same procedure to access the ISP 450. When User-B 470 dials the ISP 800 number, the SSP 480 serving User-B 470 performs a database 440 query to the SCP 430 to determine the correct local access number (LAN2) associated with User-B's number (NPA-NXX2). A call connection can then be established between User-B 470 and the ISP 450 through a different local access point (LAP2) 490.

Figure 5:
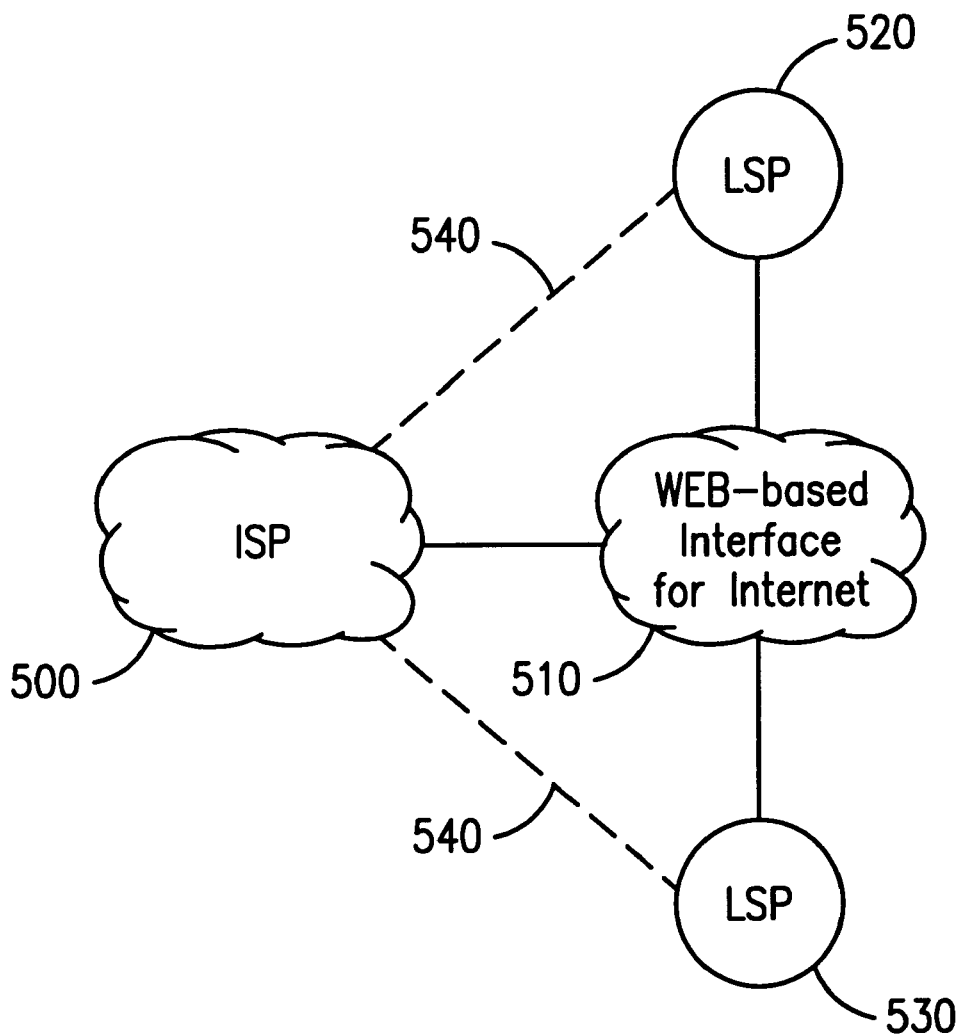
FIG. 5 demonstrates a WEB-based interface to local service providers, which is accessible by Internet Service Providers (ISPs).

In addition, analyzing traffic patterns can be a very useful tool for an ISP 500 in planning strategies for the future. Therefore, as shown in FIG. 5 of the drawings, a "Traffic Statistics" functionality can also be included along with the "Traffic Route Control" functionality to allow the ISP 500 to collect, retrieve and view statistical information on their traffic patterns. Additionally, this "Traffic Statistics" functionality can be provided via a WEB-interface to the Internet 510, as is understood in the art.

The ISP 500 can log-in on the Internet 510, access a standard menu and select the location for which they want to collect statistics, the type of statistics they want to collect, and the time interval. All local service providers (LSPs), shown as 520 and 530 for simplicity, can choose to be connected to this WEB-based interface 510. In this way, the ISP 500 can obtain all of the statistical information regarding traffic on the trunklines/bandwidth 540 allocated to the ISP 500 without burdening the local service providers (520 and 530) with the collection of this statistical data.

From this same interface 510, the ISP 500 can choose where to store these statistics, e.g., which file, and how often the statistical information should be downloaded into this file. Finally, the ISP 500 can either choose, from a predefined list, the format to view the statistics, create an additional format, or download the statistics to a disk or tape for external processing.

Advantageously, when the ISP 500 uses the "Single Number Access" functionality, the ISP 500 can log-in on the Internet 510, access a particular service area 520 and update customer-specific data. For example, when an ISP 500 offers service to a new service area 520, a local access number must be assigned to route calls from customers within that service area (NPA-NXX) to the appropriate ISP 500. Instead of the local service provider 520 manually entering this information into its system, the ISP can, via the WEB-based interface 510, enter this new local access number into the local service provider's 520 system. Thereafter, the database 440 containing the calling party number information (NPA-NXX) and associated local access numbers can be updated to include this information.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for routing a call to a given one of a plurality of Internet Service Providers, said telecommunications system comprising:

an end office associated with a local service Provider and connected to a plurality of trunklines associated with said local service provider, said trunklines being configured to transmit voice traffic, said call being received by said end office;

a database containing a list of said Internet Service Providers and associated trunkline information, each said trunkline information identifying at least a portion of a reserved one of said trunklines reserved to an associated one of said Internet Service Providers by said local service provider; and a Service Control Point in communication with said end office for accessing said database and determining said trunkline information associated with said given Internet Service Provider, said trunkline information associated with said given Internet Service Provider being provided to said end office by said Service Control Point to enable said end office to allocate said at least portion of said reserved trunkline associated with said provided trunkline information in order to establish a connection between said end office and said given Internet Service Provider for said call.

2. The telecommunications system of claim 1, further comprising a Signaling Transfer Point in communication with said Service Control Point and said end office, said trunkline information associated with said given Internet Service Provider being sent by said Service Control Point to said end office via said Signaling Transfer Point.

3. The telecommunications system of claim 1, wherein said call is placed from an Internet user in communication with said end office, said Internet user having calling number information associated therewith, said list within said database containing said calling number information, said calling number information being used by said Service Control Point to determine said trunkline information associated with said given Internet Service Provider for said end office.

4. The telecommunications system of claim 3, wherein said calling number information includes a Numbering Plan Area and an Office Code.

5. The telecommunications system of claim 3, wherein said Internet user is a computer.

6. The telecommunications system of claim 3, wherein said database contains an additional list including said calling number information and a local access number associated therewith, said Service Control Point determining said local access number and sending said local access number to said end office for connection of said call to a given one of a plurality of local access points associated with said given Internet Service Provider.

7. The telecommunications system of claim 6, wherein said Internet user dials an 800 number to be connected to said given local access point of said given Internet Service Provider.

8. The telecommunications system of claim 1, wherein said end office is a Service Switching Point.

9. The telecommunications system of claim 1, wherein said end office is in communication with a WEB-based interface, said given Internet Service Provider being in communication with said WEB-based interface, said given Internet Service Provider obtaining statistical data on traffic on said reserved trunkline associated with said given Internet Service Provider via said WEB-based interface.

10. The telecommunications system of claim 9, wherein given Internet Service Provider updates customer information associated with said end office via said WEB-based interface.

11. A method for routing a call to a given one of a plurality of Internet Service Providers, said method comprising the steps of:

receiving said call at an end office associated with a local service provider and connected to a plurality of trunklines associated with said local service provider, said trunklines being configured to transmit voice traffic;

accessing, by a Service Control Point in communication with said end office, a database containing a list of said Internet Service Providers and associated trunkline information, each said trunkline information identifying at least a portion of a reserved one of said trunklines reserved to an associated one of said Internet Service Providers bv said local service provider;

determining, by said Service Control Point, said trunkline information associated with said given Internet Service Provider;

sending said trunkline information associated with said given Internet Service Provider from said Service Control Point to said end office; and allocating said at least portion of said reserved trunkline associated with said sent trunkline information, by said end office, to establish a connection between said end office and said given Internet Service Provider for said call.

12. The method of claim 11, wherein said step of sending is performed by said Service Control Point sending said trunkline information associated with said given Internet Service Provider to said end office via a Signaling Transfer Point in communication with said Service Control Point and said end office.

13. The method of claim 11, further comprising, before said step of receiving, the step of: placing said call from an Internet user in communication with said end office, said Internet user having calling number information associated therewith, said list within said database containing said calling number information, said Service Control point using said calling number information to determine said trunkline information associated with said given Internet Service Provider for said end office.

14. The method of claim 13, wherein said calling number information includes a Numbering Plan Area and an Office Code.

15. The method of claim 13, wherein said Internet user is a computer.

16. The method of claim 13, wherein said database contains an additional list including said calling number information and a local access number associated therewith, and further comprising, before said step of sending, the steps of:

determining, by said Service Control Point, said local access number; and sending said local access number to said end office for connection of said call to a given one of a plurality of local access points associated with said given Internet Service Provider.

17. The method of claim 16, wherein said step of placing said call is performed by said Internet user dialing an 800 number, said Internet user being connected to said given local access point of said given Internet Service Provider.

18. The method of claim 11, wherein said end office is a Service Switching Point.

19. The method of claim 11, wherein said end office is in communication with a WEB-based interface, said given Internet Service Provider being in communication with said WEB-based interface, said given Internet Service Provider obtaining statistical data on traffic on said at least portion of said reserved trunkline associated with said given Internet Service Provider via said WEB-based interface.

20. The method of claim 19, wherein said given Internet Service Provider updates customer information associated with said end office via said WEB-based interface.

* * * * *